United States Patent [19]

Toya et al.

[11] Patent Number: 6,011,341
[45] Date of Patent: Jan. 4, 2000

[54] DC MOTOR HAVING A BRUSH HOLDER PROVIDED WITH A TERMINAL PROJECTION PORTION

[75] Inventors: Kazuo Toya; Kenichi Maeda; Shozo Sakon, all of Takefu, Japan

[73] Assignee: Matsushita Electric Industrial Co., Ltd., Osaka, Japan

[21] Appl. No.: 09/046,367

[22] Filed: Mar. 23, 1998

[30] Foreign Application Priority Data

May 23, 1997 [JP] Japan ...................... 9-133332

[51] Int. Cl.[7] .................. H02K 11/00; H02K 23/00; H02K 5/22
[52] U.S. Cl. .................. 310/239; 310/71; 310/249; 310/43
[58] Field of Search .................. 310/71, 239, 43, 310/248, 245, 249, 238; 29/596, 598

[56] References Cited

U.S. PATENT DOCUMENTS

| | | | |
|---|---|---|---|
| 3,789,251 | 1/1974 | King | 310/239 |
| 4,056,749 | 11/1977 | Carison, Jr. et al. | 310/239 |
| 4,677,333 | 6/1987 | Auzolat et al. | 310/239 |
| 4,845,396 | 7/1989 | Huber | 310/239 |
| 4,853,576 | 8/1989 | Mayumi et al. | 310/239 |
| 4,897,571 | 1/1990 | Isozumi | 310/239 |
| 4,978,876 | 12/1990 | Koster | 310/239 |
| 4,978,877 | 12/1990 | Quirijnen | 310/239 |
| 5,089,735 | 2/1992 | Sawaguchi et al. | 310/88 |
| 5,218,254 | 6/1993 | Someya | 310/71 |
| 5,270,599 | 12/1993 | Aoyagi et al. | 310/71 |
| 5,668,422 | 9/1997 | Deynet | 310/71 |

FOREIGN PATENT DOCUMENTS 9-98559  4/1997  Japan .

*Primary Examiner*—Nestor Ramirez
*Assistant Examiner*—Tran Nguyen
*Attorney, Agent, or Firm*—Ratner & Prestia

[57] ABSTRACT

A DC motor has a projection which projects from the bottom surface of the brush-holder plate. The projection extends to outside in the axial direction of the motor. A terminal conductor is inserted into a perforated hole formed in the projection. One end of the terminal conductor is exposed to the outside of the motor from the tip of the projection, while another end of the terminal conductor is connected electrically to the brush. The projection functions as the built in type electrical connector to the motor, which when coupled to a power supply, powers the DC motor.

8 Claims, 3 Drawing Sheets

DC MOTOR HAVING A BRUSH HOLDER PROVIDED WITH A TERMINAL PROJECTION PORTION

FIELD OF THE INVENTION

The present invention relates to a DC motor which is used, or example, in the hydraulic unit of an automobile.

CONVENTIONAL ART

FIG. 5 is a partial sectional view of a conventional DC motor. A stator 1 has a cup shaped stator yoke 4 made of steel plate and a permanent magnet 3 fixed in the stator yoke 4. A cover 10 closes the open end of the stator yoke 4 accommodating a rotor 2 within the stator rotating freely. A rotating shaft 13 of the rotor 2 extends to the outside of the motor through a bearing 11 held in the cover 10. A brush-holder 8 is fixed to the inner surface of the cover 10 by any conventional means such as a rivet (not shown).

FIG. 6 is a top view of the brush-holder 8, in which a terminal plate 7 and a brush-box 6 both made of metal plate are set on a brush-holder plate 8a made of synthetic resin. The terminal plate 7 and the brush-box 6 are assembled together. A brush 5 is pressed to a commutator 16 of the rotor 2 by a spring (not shown) in the brush-box 6. A pigtail 17 of the brush 5 is connected to a point A on the terminal plate 7 by spot welding or soldering. A lead 14 is connected to a point B on the terminal plate 7 by spot welding or soldering. The lead 14 is led to the outside of the motor through a rubber bushing 15. By the connections mentioned above, the lead 14 is connected electrically to the brush 5 through the terminal plate 7.

SUMMARY OF THE INVENTION

A DC motor includes an electrical connector. The DC motor has a projection which projects from the bottom surface of the brush-holder plate. The projection extends in the axial direction of the motor through a hole formed in the cover. A terminal conductor is inserted into a perforated hole formed in the projection. One end of the terminal conductor is exposed from a tip of the projection, while another end of the terminal conductor is connected electrically to the brush. The projection functions as the electrical connector of the motor. Alternatively, the cover is omitted. The brush-holder plate then closes the cup shaped stator in place of the cover.

DETAILED DESCRIPTION

Figure 1:
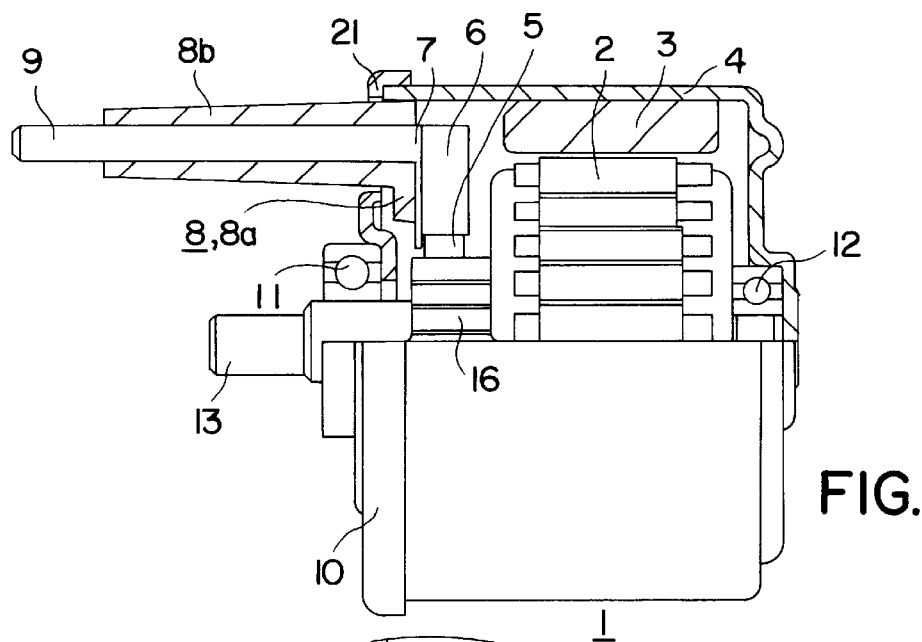
FIG. 1 is a partial sectional view of the DC motor according to a first exemplary embodiment of the present invention.
Figure 5:
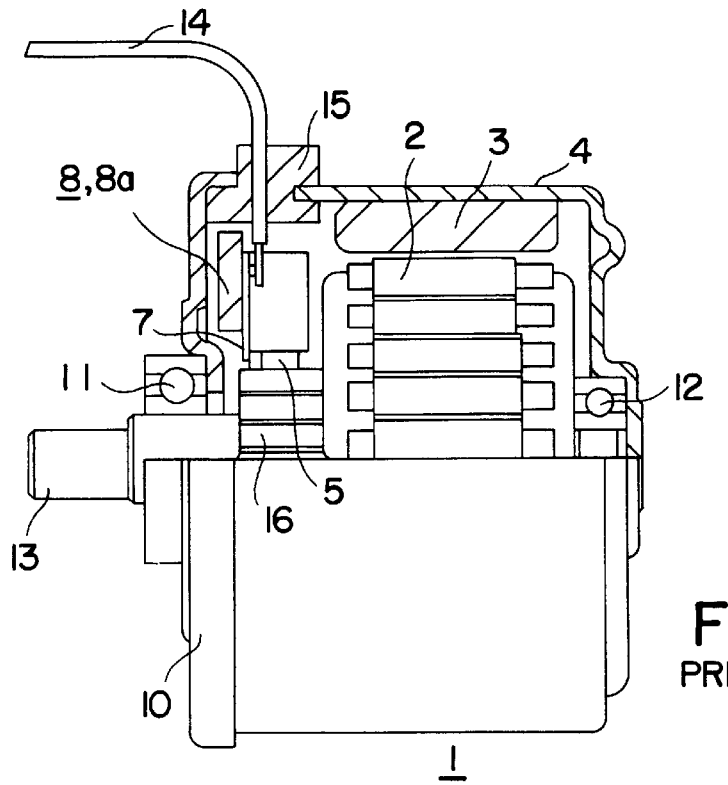
FIG. 5 is a partial sectional view of a conventional DC motor.
Figure 6:
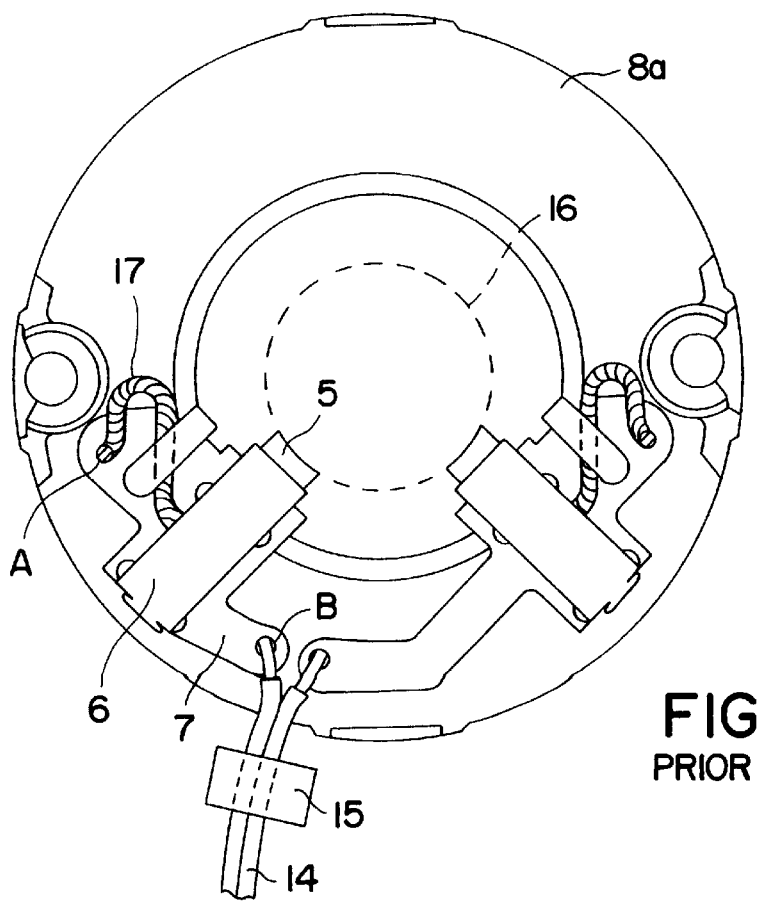
FIG. 6 is a top view of the brush-holder of the conventional DC motor shown in FIG. 5.

FIG. 1 is a partial sectional view of the DC motor according to a first embodiment of the present invention. The same number is given to elements shared with the conventional DC motor of FIGS. 5 and 6. A stator 1 has a cup shaped stator yoke 4 made of steel plate and a permanent magnet 3 fixed in the stator yoke 4. A cover 10 closes the open end of the stator yoke 4 accommodating a rotor 2 within the stator rotating freely. A hole 21 is formed in cover 10. A rotating shaft 13 of the rotor 2 extends to the outside of the motor through a bearing 11 held in the cover 10. A brush-holder 8 is fixed on the inner surface of the cover 10 by any conventional means such as a rivet (not shown).

Figure 2A:
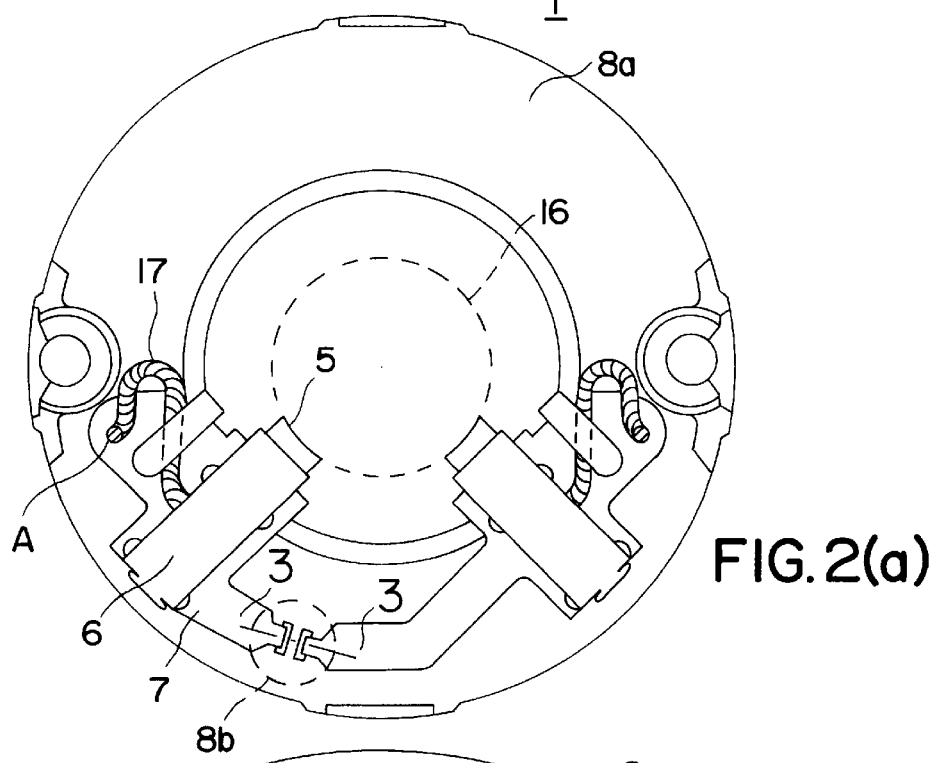
FIG. 2a is a top view of the brush-holder of the DC motor according to the first exemplary embodiment of the present invention.

FIG. 2a is a top view of the brush-holder 8, in which a terminal plate 7 and a brush-box 6 both made of metal plate are set on a brush-holder plate 8a made of synthetic resin. The terminal plate 7 and the brush-box 6 are assembled to each other. A brush 5 is pressed to a commutator 16 of the rotor 2 by a spring (not shown) in the brush-box 6. A pigtail 17 of the brush 5 is connected to a point A on the terminal plate 7 by spot welding or soldering. Numeral 8b (broken line) references a projection extending from the bottom surface.

Figure 2B:
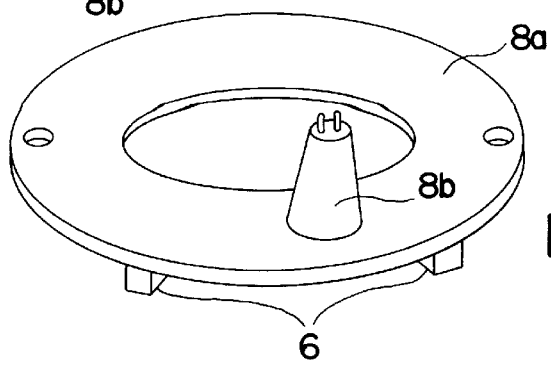
FIG. 2b is a perspective view of the bottom surface of the brush-holder of the DC motor according to the first exemplary embodiment of the present invention.

FIG. 2b is a perspective view of the bottom surface of brush-holder plate 8a. The projection 8b is preferably resin molded to brush-holder plate 8a. The projection 8b projects from the bottom surface of the brush-holder plate 8a. Projection 8b extends in the axial direction of the motor through the hole 21 of the cover 10 as shown in FIG. 1.

Figure 3:
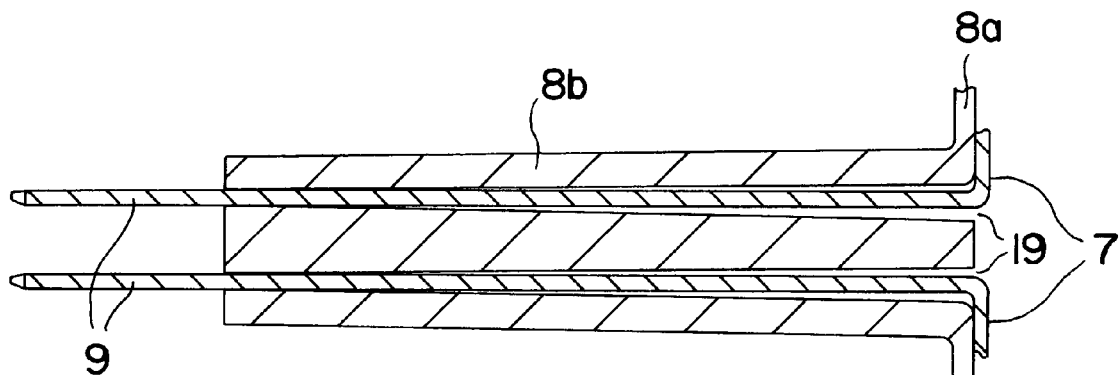
FIG. 3 is a cross sectional view of the projection at the 3—3 sectional line in FIG. 2.

FIG. 3 is a cross sectional view of the projection 8b at the 3—3 section of FIG. 2a. The projection 8b has at least one perforated hole 19. A terminal conductor 9 formed as one body with terminal plate 7 is inserted in the perforated hole 19. One end of the terminal conductor 9 is exposed to the outside from a tip of the projection 8b, while another end of the terminal conductor 9 is connected electrically to the brush through the terminal plate 7. The perforated hole 19 is wide at the bottom of the projection 8b so terminal conductor 9 is inserted easily, but narrow at the tip of projection 8b so the exposed end of the terminal conductor 9 is held in position. In this way, projection 8b functions as the electrical connector which, when coupled to a power supply, powers the DC motor. The present embodiment provides an electrical connector (built in) to the DC motor.

(2nd. Embodiment)

Figure 4:
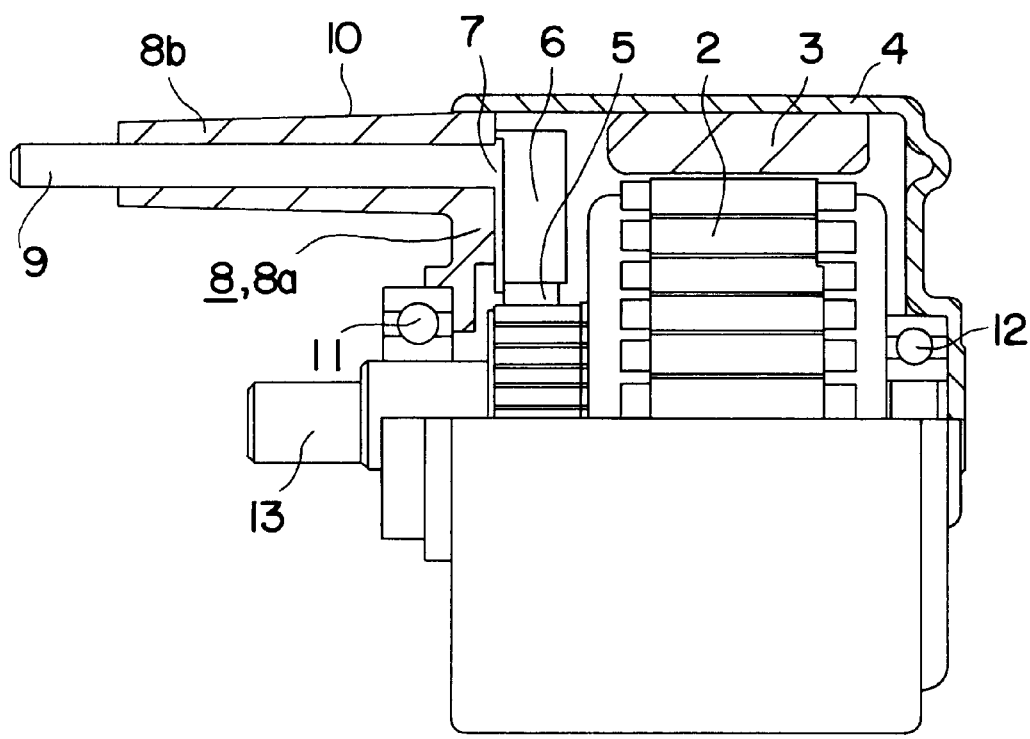
FIG. 4 is a partial sectional view of the DC motor according to a second exemplary embodiment of the present invention.

FIG. 4 is a partial sectional view of a DC motor according to the second exemplary embodiment of the present invention The cover of the first embodiment is omitted in order to further simplify the motor composition. A brush-holder plate 20a made of synthetic resin serves as the cover of the first embodiment. The brush-holder plate 20 closes the open end of the stator yoke 4 accommodating a rotor 2 within the stator which rotates freely. A rotating shaft 13 of the rotor 2 extends to outside of the motor through a bearing 11 held in the brush-holder plate 20a. This exemplary embodiment provides a further simplified DC motor over the DC motor of the first embodiment.

What is claimed is:

1. A DC motor comprising:

a rotor;

a cup shaped stator;

a cover which closes the cup shaped stator having a hole formed therein;

a brush-holder facing an inner surface of the cover, said brush-holder comprising, (i) a brush-holder plate,
(ii) a terminal plate fixed on an upper surface of the brush-holder plate, and
(iii) a brush in contact with the rotor;

said brush-holder plate having a projection which projects from the bottom surface of the brush-holder plate, and which extends to outside of the motor in the axial direction of the motor through the hole of the cover, said projection having at least one perforated hole within; and a one-piece conductor forming the terminal plate at one end and a wire at another end, said wire non-removably affixed to said terminal plate forming a single integrated piece, wherein said conductor is inserted into the perforated hole of the projection so that (a) said wire is exposed to the outside of said motor from a first end of the projection, (b) said terminal plate is in contact with said brush-holder plate at a second end of the projection, and (c) said conductor is electrically in contact with the brush.

2. The DC motor according to claim 1, wherein said perforated hole of the projection is wider at the second end of the projection than at the first end of the projection.

3. The DC motor according to claim 1, wherein the projection is molded to said brush-holder plate.

4. The DC motor according to claim 1, wherein the projection and said brush-holder plate are formed as a unitary member.

5. A DC motor comprising:

a rotor;

a cup shaped stator;

a brush-holder comprising
(i) a brush-holder plate,
(ii) a terminal plate fixed on an upper surface of the brush-holder plate, and
(iii) a brush, the brush holder plate closing the cup shaped stator and said brush-holder plate having a projection which projects from the bottom surface of the brush-holder plate, and extends in the axial direction of the motor, said projection having at least one perforated hole formed within; and a one-piece conductor forming the terminal plate at one end and a wire at another end, said wire non-removably affixed to said terminal plate forming a single integrated piece, wherein said conductor is inserted into the perforated hole of the projection so that (a) said wire is exposed to the outside of said motor from a first end of the projection, (b) said terminal plate is in contact with said brush-holder plate at a second end of the projection, and (c) said conductor is electrically in contact with the brush.

6. The DC motor according to claim 4, wherein said perforated hole of the projection is wider at the second end of the projection than at the first end of the projection.

7. The DC motor according to claim 5, wherein the projection is molded to said brush-holder plate.

8. The DC motor according to claim 5, wherein the projection and said brush-holder plate are formed as a unitary member.

* * * * *

UNITED STATES PATENT AND TRADEMARK OFFICE
CERTIFICATE OF CORRECTION

PATENT NO. : 6,011,341
DATED : January 4, 2000
INVENTOR(S) : Toya et al.

It is certified that error appears in the above-identified patent and that said Letters Patent is hereby corrected as shown below:

Column 4,
Line 23, delete "4" and insert --5--.

Signed and Sealed this

Tenth Day of July, 2001

Attest:

*Nicholas P. Godici*

NICHOLAS P. GODICI
*Acting Director of the United States Patent and Trademark Office*

*Attesting Officer*